(12) United States Patent
Monteiro et al.

(10) Patent No.: US 8,887,126 B1
(45) Date of Patent: *Nov. 11, 2014

(54) VERSION CONTROL IN MODELING ENVIRONMENTS

(71) Applicant: The MathWorks, Inc., Natick, MA (US)

(72) Inventors: Ricardo Monteiro, Brookline, MA (US); Mojdeh Shakeri, Southborough, MA (US); Robert O. Aberg, South Grafton, MA (US); Michael David Tocci, Medway, MA (US); Pieter J. Mosterman, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 24 days.

This patent is subject to a terminal disclaimer.

(21) Appl. No.: 13/705,917

(22) Filed: Dec. 5, 2012

Related U.S. Application Data

(63) Continuation of application No. 12/794,364, filed on Jun. 4, 2010, now Pat. No. 8,341,594, which is a continuation of application No. 10/888,705, filed on Jul. 8, 2004, now Pat. No. 7,739,655.

(51) Int. Cl.
*G06F 9/44* (2006.01)
*G06F 9/45* (2006.01)

(52) U.S. Cl.
CPC .............................. *G06F 8/71* (2013.01)
USPC ........... 717/105; 717/109; 717/113; 717/125; 703/22

(58) Field of Classification Search
USPC ........................................................ 717/105
See application file for complete search history.

(56) References Cited

U.S. PATENT DOCUMENTS

| 5,581,755 | A | 12/1996 | Koerber et al. |
| 5,586,304 | A | 12/1996 | Stupek, Jr. et al. |
| 5,706,510 | A | 1/1998 | Burgoon |
| 5,734,899 | A | 3/1998 | Yoshizawa et al. |
| 6,102,965 | A | 8/2000 | Dye et al. |
| 6,112,024 | A * | 8/2000 | Almond et al. ............... 717/122 |
| 6,192,379 | B1 | 2/2001 | Bekenn |

(Continued)

OTHER PUBLICATIONS

Denckla, Ben et al., "Hierarchical Hybrid Block Diagrams," retrieved online at: http://citeseerx.ist.psu.edu/viewdoc/versions?doi=10.1.1.60.8417, 9 pages (2006).

(Continued)

*Primary Examiner* — Don Wong
*Assistant Examiner* — Marina Lee
(74) *Attorney, Agent, or Firm* — Nelson Mullins Riley & Scarborough LLP (57) ABSTRACT

Methods and systems for controlling versions of models in modeling environments are disclosed. The versions of models and component interfaces are stored in a repository and checked in and out of the repository. The version designation of a model is changed when the model is checked in the repository. A selected version of the model is checked out of the repository and loaded directly in a memory so that users may load the selected version of the model without error. The loaded model is displayed with information on the version of the model. The version information may include the version number and author of the version. The version information may also include information on whether the model is locked with a version or in a read only mode.

20 Claims, 10 Drawing Sheets

(56) References Cited

U.S. PATENT DOCUMENTS

| | | |
|---|---|---|
| 6,301,592 B1 | 10/2001 | Aoyama et al. |
| 6,437,805 B1 | 8/2002 | Sojoodi et al. |
| 6,449,624 B1 | 9/2002 | Hammack et al. |
| 6,460,052 B1 | 10/2002 | Thomas et al. |
| 6,493,594 B1 | 12/2002 | Kraml |
| 6,868,425 B1 | 3/2005 | Bergstraesser et al. |
| 6,993,759 B2 | 1/2006 | Aptus et al. |
| 7,024,631 B1 | 4/2006 | Hudson et al. |
| 7,089,530 B1 | 8/2006 | Dardinski et al. |
| 7,093,232 B1 | 8/2006 | Chatzigianis et al. |
| 7,117,492 B2 | 10/2006 | Ikeda et al. |
| 7,120,896 B2 | 10/2006 | Budhiraja et al. |
| 7,203,938 B2 | 4/2007 | Ambrose et al. |
| 7,272,815 B1 | 9/2007 | Eldridge et al. |
| 7,487,080 B1 | 2/2009 | Tocci et al. |
| 7,542,888 B2 | 6/2009 | Critz et al. |
| 7,739,655 B1 | 6/2010 | Monteiro et al. |
| 7,904,876 B1 | 3/2011 | Critz |
| 8,229,871 B2 | 7/2012 | Woolf et al. |
| 2002/0029218 A1* | 3/2002 | Bentley et al. ............ 707/100 |
| 2003/0016246 A1* | 1/2003 | Singh ...................... 345/763 |
| 2003/0101025 A1 | 5/2003 | Shah et al. |
| 2003/0158871 A1 | 8/2003 | Fomenko |
| 2004/0103393 A1 | 5/2004 | Reddy et al. |
| 2004/0249867 A1 | 12/2004 | Kraiss et al. |
| 2005/0257195 A1 | 11/2005 | Morrow et al. |
| 2011/0161054 A1 | 6/2011 | Woolf et al. |

OTHER PUBLICATIONS

Diedrich, Christian et al., "Function block applications in control systems based on IEC 61804," ISA Transactions, vol. 43:123-131 (2004).

The MathWorks, Inc., "Simulink, Dynamic System Simulation for Matlab, Using Simulink, Version 3," 605 pages, (1999).

Zhao, J. Leon et al., "Building Workflow Engines for Commerce Logic Automation," Proceedings of the Americas Conference on Information Systems (AMCIS), pp. 558-561 (2000).

* cited by examiner

VERSION CONTROL IN MODELING ENVIRONMENTS

FIELD OF THE INVENTION

The present invention relates generally to modeling or graphical programming environments and more particularly to methods and systems for controlling versions of models in the modeling or graphical programming environments.

BACKGROUND OF THE INVENTION

Various classes of block diagrams describe computations that can be performed on application specific computational hardware, such as a computer, microcontroller, FPGA, and custom hardware. Classes of such block diagrams include time-based block diagrams, such as those found within Simulink®, from The MathWorks, Inc. of Natick, Mass., state-based and flow diagrams, such as those found within Stateflow®, from The MathWorks, Inc. of Natick, Mass., data-flow diagrams, and software diagrams, such as those found in the Unified Modeling Language.

Historically, engineers and scientists have utilized time-based block diagram models in numerous scientific areas such as Feedback Control Theory and Signal Processing to study, design, debug, and refine dynamic systems. Dynamic systems, which are characterized by the fact that their behaviors change over time, are representative of many real-world systems. Time-based block diagram modeling has become particularly attractive over the last few years with the advent of software packages, such as Simulink®. Such packages provide sophisticated software platforms with a rich suite of support tools that makes the analysis and design of dynamic systems efficient, methodical, and cost-effective.

A dynamic system (either natural or man-made) is a system whose response at any given time is a function of its input stimuli, its current state, and the current time. Such systems range from simple to highly complex systems. Physical dynamic systems include a falling body, the rotation of the earth, bio-mechanical systems (muscles, joints, etc.), biochemical systems (gene expression, protein pathways), weather and climate pattern systems, etc. Examples of man-made or engineered dynamic systems include: a bouncing ball, a spring with a mass tied on an end, automobiles, airplanes, control systems in major appliances, communication networks, audio signal processing, nuclear reactors, a stock market, etc. Professionals from diverse areas such as engineering, science, education, and economics build mathematical models of dynamic systems in order to better understand system behavior as it changes with the progression of time. The mathematical models aid in building "better" systems, where "better" may be defined in terms of a variety of performance measures such as quality, time-to-market, cost, speed, size, power consumption, robustness, etc. The mathematical models also aid in analyzing, debugging and repairing existing systems (be it the human body or the anti-lock braking system in a car). The models may also serve an educational purpose of educating others on the basic principles governing physical systems. The models and results are often used as a scientific communication medium between humans. The term "model-based design" is used to refer to the use of block diagram models in the development, analysis, and validation of dynamic systems.

In designing the models of the modern systems, the size of the models is being increased to a stunning level of complexity. Hundreds of thousands of components may be included in the models. In order to manage the complexity of the models, the technologies of hierarchy, abstraction, and partitioning are utilized. The hierarchy is typically captured by so-called 'subsystems.' Because subsystems may contain their own subsystems, they provide a mechanism for the hierarchical structure of the models. Abstraction allows simplifying system behavior in the models if it is not important to the problem that needs to be addressed and for which the models are designed. Including arbitrary detail often complicates and hampers the design, analysis, and/or synthesis of the model. Partitioning is used to create separate and independent modules (or 'units') in the models. The partitioning facilitates engineers to work on engineering projects where each engineer (or a group of engineers) is responsible for one unit of the models. The aforementioned technologies may help design the models of the devices that have a high level of complexity. However, the models designed utilizing the aforementioned technologies still need to be tracked and recorded in order to maintain a coherent development process.

SUMMARY OF THE INVENTION

The present invention provides methods and systems for controlling the versions of models in modeling or graphical programming environments. The present invention controls the versions of models designed in the modeling or graphical programming environments. The present invention may also control the versions of models primitively provided by the modeling or graphical programming environments. The present invention controls the versions of models for systems and the components of the systems.

The versions of models are stored in a repository and checked in and out of the repository. The version information of models may be changed when the versions of models are checked in the repository. The selected versions of models are checked out of the repository and loaded directly into a memory so that users may load the selected versions of models without error. The loaded versions of models are displayed with the version information on the versions of models. The version information may include the model version designations, interface (I/O) version designations, change logs, dates of changes and authors of the versions. The version information may also include information on whether the models are locked with a version or in a read only mode.

A model may include a component referring to another model (referenced model) that has a plurality of versions. The component may be a subsystem in the hierarchy of the model or a module (or unit) in the partitioning of the model. The model contains the version information of the referenced model. The present invention evaluates the component of the model to find whether the component of the model matches interface and model version designations stored in the referenced model. The result of the evaluation information is provided to users so that the users may change the design of the model in response to the version control of the present invention. If the component does not match with the functionality of the referenced model, the present invention may provide version information on the versions of the referenced model so that users may select one of the versions of the referenced model. The component may be refreshed with the selected version of the referenced model.

In accordance with one aspect of the present invention, a method is provided for controlling versions of a model in an electronic device that provides modeling environments. A graphical element is displayed on the display of the electronic device. The graphical element represents the component of a first model that refers to a second model. The first model is provided with version information of the second model. The version information of the second model is displayed in a location associated with the graphical element.

In another aspect of the present invention, a method is provided for controlling versions of a model in an electronic device that provides modeling environments. A graphical element is displayed on a display of the electronic device. The graphical element represents the component of a first model that refers to a second model. The first model is evaluated to determine whether the component of the first model matches with a functionality of the second model that the component of the first model refers to. The result of the evaluation is displayed in connection with the graphical element.

In still another aspect of the present invention, a method is provided for controlling versions of a model in an electronic device that provides modeling environments. A graphical element is displayed on a display of the electronic device. The graphical element represents a component of a first model that refers to a second model. The first model is provided with the version information of the second model. The version information of the second model provided with the first model is compared with the version information of the second model stored in the second model. Finally, it is determined whether the interface of the component is compatible with the interface of the second model based on the comparison of the version information of the second model.

In yet still another aspect of the present invention, a system is provided for controlling versions of a model in modeling environments. The system is implemented in an electronic device that provides the modeling environments. The system includes a modeling tool for designing a first model that includes a component referring to a second model. The modeling tool determines whether the component matches with the second model. The system also includes a repository for storing versions of the second model. A selected version of the second model is loaded into a memory directly from the repository.

By providing version control of models in the modeling environments, the present invention enables users to design the models with a high level of complexity. In addition, the present invention integrates seamlessly the modeling environments with version control facilities. As a result, the present invention provides sophisticated versioning of the models and accurate loading of a selected version of each of the models.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

The illustrative embodiment of the present invention concerns a version control system for models in modeling environments, such as block diagram environments. The block diagrams in such environments may be graphical representations of real systems. The blocks in the block diagrams are functional entities that perform operations on the data being processed by the systems. One of skill in the art will appreciate that the block diagrams are an illustrative graphical modeling environment and the present invention may apply to other types of modeling environments including textual modeling environments. One of skill in the art will also appreciate that the present invention may apply to graphical programming environments such as time-based block diagrams, dataflow diagrams, state-based and flow diagrams, software diagrams, and other graphical models. Depending on the semantics associated to the execution of a block diagram and its components, the block diagram can be used to represent a computer program in a graphical manner. In general, a set of sequential and parallel executions can be represented in block diagrams. Graphical programming environments that facilitate the use of block diagrams may provide additional graphical associations and constructs that are different and complementary to those of block diagrams.

The block diagram environments in the illustrative embodiment of the present invention provide version control facilities for controlling a plurality of versions of models. The versions of the models are stored in a repository and checked in and out of the repository. When a model is checked into the repository, the version information of the model is automatically changed. Selected versions of models are checked out of the repository and loaded directly into a memory. The version information of the models is displayed associated with the representations of the models. The version information may include the model version designations, interface version designations, change logs, dates of changes and authors of the versions. The version information may also include information on whether the models are locked with a designated version or in a read only mode. One of skill in the art will appreciate that the version information may include other information relating to the versions of models, such as the information on whether the versions of models are checked out.

The illustrative embodiment of the present invention also provides the configuration management of models utilizing the version control of the models in the block diagram modeling environments. The configuration management determines the configuration of each version of the models. The configuration of each version of the models may include information on the components of each version of the models, such as information on the version of the components. The version information of the components may include information on the content version and interface version of the components. The information on the content version of the components may include the information on the particulars of the content of the components and information on the content version designations of the components. The information on the interface version of the components may include information on the particulars of the interfaces of the components and information on the interface version designations of the components. The configuration management in the illustrative embodiment of the present invention keeps track of changes in the configuration of the models. The illustrative embodiment compares the configuration of each version of the models with the configurations of other versions of the models to identify changes in the configuration of each version of the models. If there is a change or difference in the configuration of each version of the models, the illustrative embodiment manages the versions of models with different designations.

The models may include component blocks that refer to other models in the modeling environments. In designing complex models, subsystems and partitioning technologies are utilized. Because subsystems may contain subsequent subsystems, they provide a mechanism for the hierarchical structure of the models. Partitioning is used to create separate and independent modules (or 'units') in the models so that it facilitates engineers (or, likewise, modelers and programmers) to work on engineering projects where each engineer (or a group of engineers) is responsible for one unit of the models. The models may include subsystems or modules that refer to other models having a plurality of versions. The illustrative embodiment of the present invention evaluates the block diagrams of the models to find whether the component blocks of the models match with the functionalities of the models that the component blocks refer to. The result of the evaluation is provided to users so that the users may design the models in response to the version control of the models provided in the illustrative embodiment of the present invention. When the component blocks do not match with the functionalities of the referenced models, information on the versions of the referenced models is provided to users so that the users may select one of the versions of the referenced models that match with the component blocks. The component blocks of the models are refreshed with the selected version of the referenced model.

Figure 1:
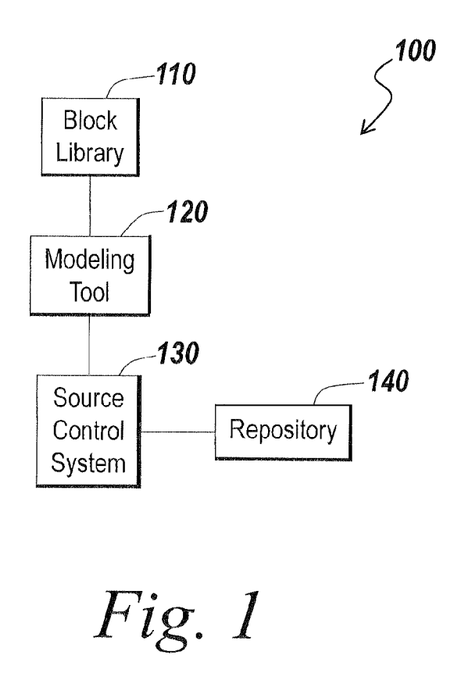
FIG. 1 is an exemplary modeling environment that utilizes blocks to represent models in the illustrative embodiment of the present system.

FIG. 1 is an exemplary modeling environment in which blocks are utilized to represent models in the illustrative embodiment of the present invention. The environment 100 includes a block library 110, a modeling tool 120, a source control system 130 and a repository 140. One of skill in the art will appreciate that the modeling environment 100 is not limited to block diagram programming environments, but rather includes any other modeling environments, such as state, flow, class, and the Unified Modeling Language diagrams.

The block library 110 contains blocks of application specific models that support the modeling of systems. The blocks in the block library 110 are incorporated into the models of the systems designed using the modeling tool 130. The blocks provided from the block library 100 are represented in block symbols in the illustrative embodiment of the present invention. One of skill in the art will appreciate that the blocks provided from the block library 100 can be represented in other graphical symbols or textual symbols. An illustrative embodiment of the block library 110 may be found in blocksets found in Simulink® as well as the DSP Blockset, Fixed-point Blockset, Aerospace Blockset, and Communications Blockset, from The MathWorks, Inc. of Natick, Mass. The Blocksets provide models and utilities for the development and integration of models for target systems and sub-systems of the target systems.

The modeling tool 120 provides graphical environments for modeling, simulating, and analyzing target systems. The modeling tool 120 incorporates the blocks provided from the block library 110 into the models of the target systems. The target systems designed in the modeling tool 120 are simulated in the modeling tool 120 to analyze the behavior of the designed target systems. Exemplary modeling tool 120 may be found in Simulink®, from The MathWorks, Inc. of Natick, Mass. Simulink® enables users to design a block diagram for a target system as an executable specification, simulate the system's behavior, analyze the performance of the system, and refine the design of the system. Simulink® allows users to design target systems through a user-interface that allows drafting of block diagram models of the target systems. All of the blocks in the block library 110 are available to users when the users are building the block diagram of the target systems. Individual users may be able to customize this model block to: (a) reorganize blocks in some custom format, (b) delete blocks they do not use, and (c) add custom blocks they have designed. The blocks may be dragged using some human-machine interface (such as a mouse or keyboard) from the block library 110 on to the window (i.e., model canvas). Simulink® includes a block diagram editor that allows users to perform such actions as draw, edit, annotate, save, and print out block diagram representations of target systems. The block diagram editor is a graphical user interface (GUI) component that allows drafting of block diagram models by users. In Simulink®, there is also a textual interface with a set of commands that allow interaction with the graphical editor. Using this textual interface, users may write special scripts that perform automatic editing operations on the block diagram. Simulink® also allows users to simulate the designed target systems to determine the behavior of the systems. Simulink® includes a block diagram execution engine that carries out the task of compiling and linking the block diagram to produce an "in-memory executable" version of the model that is used for generating code and/or simulating a block diagram model.

The modeling tool 120 is interfaced with the source control system 130 that is coupled to a repository 140. The modeling tool 120 is seamlessly integrated with the source control system 130 to provide sophisticated versioning of a model and accurate loading of a selected version of the model. The source control system 130 enables users to check models into and out of the repository 140. If users open a model in the modeling tool 120 and modify it without checking it out of the repository, the model remains in a read-only mode so that the modification is not overwritten over the version of the model. The users may select the source control system 130 if more than one source control system 130 is provided in the modeling environment 100. An example of the source control system 130 may include Microsoft Visual SourceSafe from Microsoft, Inc. of Redmond, Wash. One of skill in the art will appreciate that the source control system 130 may include other source control systems that the modeling tool 120 supports the interface with. The interface of the modeling tool 120 with the source control system 130 is described in more detail with reference to FIG. 3.

Figure 2:
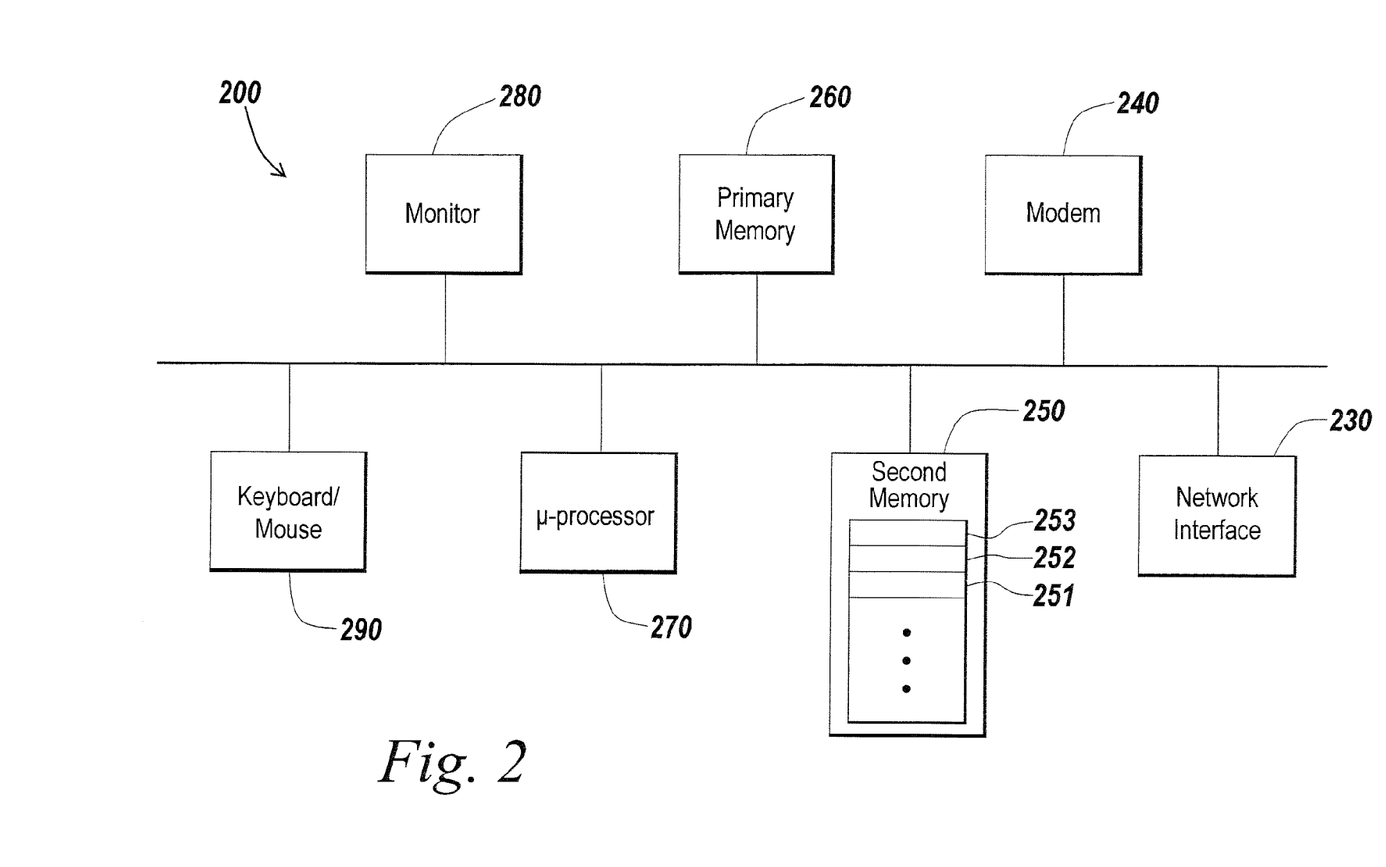
FIG. 2 is an electronic device suitable for practicing the illustrative embodiment of the present invention.

FIG. 2 is an exemplary electronic device 200 suitable for practicing the illustrative embodiment of the present invention. The electronic device 200 includes a network interface 230, a MODEM 240, a secondary memory 250, a primary memory 260, a microprocessor 270, a monitor 280 and a keyboard/mouse 290. The microprocessor 270 controls each component of the electronic device 200 to run the software tools in the modeling environment 100 properly. The electronic device 200 receives the data necessary for designing a model and controlling the version of the model through the keyboard/mouse 290. The electronic device 200 displays in the monitor 280 the model with the version information of the model. The primary (working) memory 260 fetches from the secondary (storage) memory 250 and provides to the microprocessor 270 the codes that need to be accessed quickly by the microprocessor 270 to operate the electronic device 200 and to run the modeling environment 100. A selected version of model may be loaded from the repository 140 directly into the primary memory. The secondary memory 250 usually contains software tools for applications. The secondary memory 250 includes, in particular, code 251 for the block library 110, code 252 for the modeling tool 120, and code 253 for the source control system 130. The network interface 230 and the MODEM 240 enable the electronic device 200 to communicate with other electronic devices through communication networks, such as Internet, intranet, LAN (Local Area Network), WAN (Wide Area Network) and MAN (Metropolitan Area Network). The communication facilities may support for the distributed implementations of the present invention.

Figure 3:
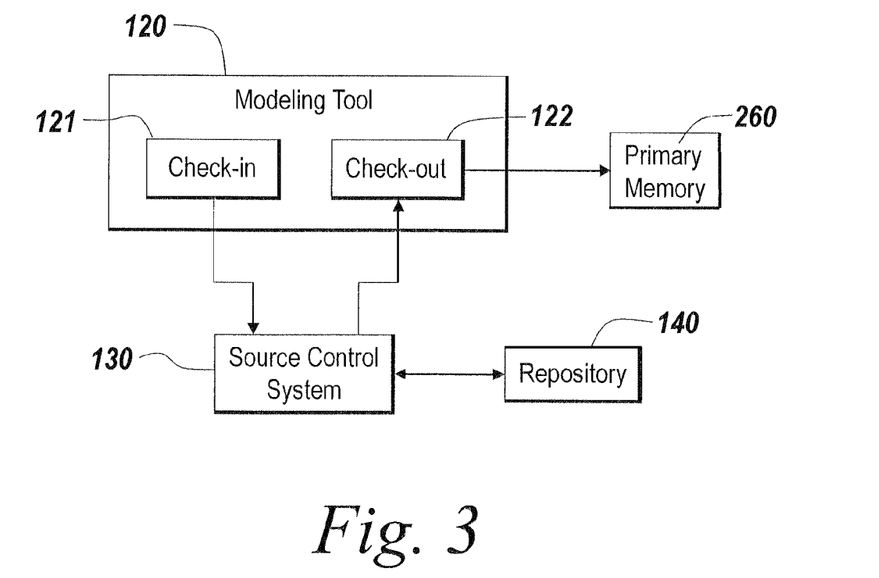
FIG. 3 is a detailed diagram showing the interface of the modeling tool with the source control system in the modeling environment of the illustrative embodiment of the present invention depicted in FIG. 1.

FIG. 3 is a detailed diagram showing the interface of the modeling tool 120 with the source control system 130 in the modeling environment 100 of the illustrative embodiment of the present invention depicted in FIG. 1. The modeling tool 120 is seamlessly interfaced and integrated with the source control system 130. The modeling tool 120 includes a check-in facility 121 and a check-out facility 122. The check-in facility 121 interfaces the modeling tool 120 with the source control system 130 and checks models designed in the modeling tool 120 into the source control system 130. The source control system 130 is coupled to a repository 140 and stores the models in the repository 140. The check-in facility 121 may also check blocks provided by the block library 110 into the source control system 130. When the models are checked into the source control system 130, the version designations of the models are by default automatically changed to manage the versions of the models checked into the source control system 130. Management schemes other than incrementing may also be used. The check-out facility 122 interfaces the modeling tool 120 with the source control system 130 and checks models out of the source control system 130. The source control system 130 gets the models from the repository 140 and forward them to the modeling tool 120. The models checked out of the source control system 130 are directly loaded in the primary memory 260 so that users may utilize the models. The direct loading of the models in the primary memory 260 ensures the accurate loading of desired versions of the models from the repository 140. The direct loading prevents loading error that may occur when the checked-out models are loaded in the primary memory 260 through the secondary memory 250.

Figure 4:
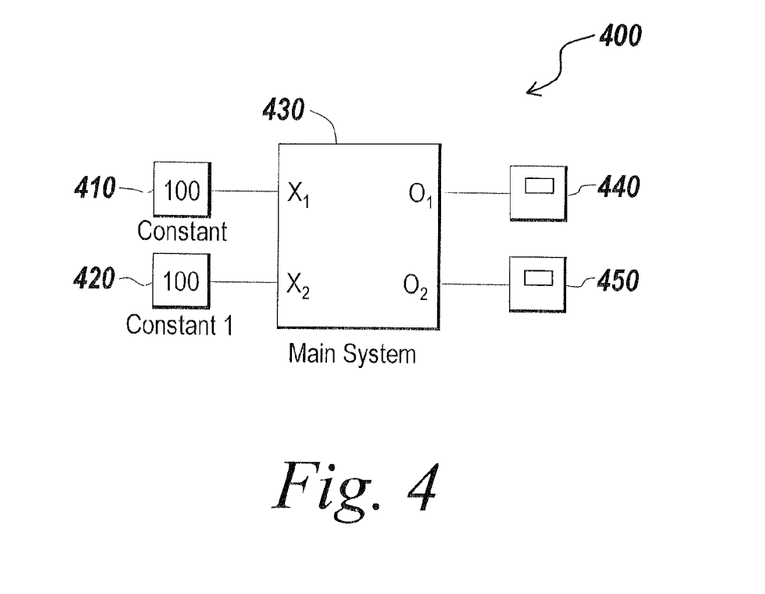
FIG. 4 is an exemplary model designed in the modeling environment in the illustrative embodiment of the present invention depicted in FIG. 1.

FIG. 4 is an exemplary model 100 designed in the modeling environment 100 in the illustrative embodiment of the present invention depicted in FIG. 1. The model 400 may be designed by users or initially provided from the block library 110. One of skill in the art will appreciate that the model 400 is an illustrative example and the present invention may apply to other models. The model 400 includes constant blocks 410 and 420, a Main System block 430 and scope blocks 440 and 450. The constant blocks 410 and 420 and the scope blocks 440 and 450 are coupled to the input and output terminals of the Main System block 430, respectively. The Main System block 430 refers to another model to perform a function that processes inputs X1 and X2 and produces outputs O1 and O2.

Figure 5A:
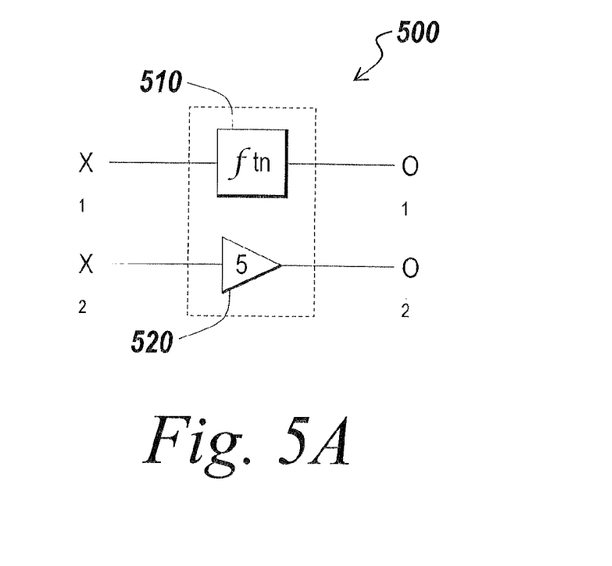
FIG. 5A is an exemplary model that the Main System block depicted in FIG. 4 refers to in the illustrative embodiment of the present invention.

The Main System block 430 may refer to another model depicted, for example, in FIG. 5A in the illustrative embodiment of the present invention. One of skill in the art will appreciate that the model depicted in FIG. 5A is illustrative and the Main System block 430 may refer to other models. The model 400 contains the version information of the model 400. The version information may include version designations, a creator, a modifier and a change history of the model 400. The illustrative embodiment of the present invention provides separate version designations for designating a model version and an interface version. The model version designation may reflect any changes in the model 400 including content and interface of the model 400. The interface version designation may reflect changes only in the interface of the model 400. Therefore, the model version designation may be different than the interface version designation if there are changes only in the content of the model 400. The version information may also include information whether the model 400 is locked with a version or in a read only mode. One of skill in the art will appreciate that the version information described above is illustrative and the version information may include other information regarding the changes in the versions of the model, such as the date of creation or modification.

The model 400 also contains the version information of the components of the model 400, such as the Main System block 430. Therefore, the model 400 contains the version information of the model 500 that the Main System block 430 refers to. The version information may include information regarding the version designations, creator, modifier and change history of the referenced model 500. The version information may include both a model version designation and an interface version designation of the model 500. The model version designation may designate the model version of the model 500 that is referred to by the Main System block 430. The model interface version designation may designate the interface version of the model 500 that is referred to by the Main System block 430. The version information may also contain the information whether the Main System block 430 is locked with a version of the referenced model 500 or in a read only mode. The following is the exemplary version information on the Main System block 430 stored in the Main System block 430 of the model 400.

```
Block {
    BlockType              ModelReference
    Name                   "Main System"
    Ports                  [2, 2]
    Position               [110, 42, 280, 138]
    ModelName              "msubsys_drawicon_sub"
    ModelReferenceVersion      "1.1"
    InterfaceReferenceVersion   "1.1"
    List {
        ListType           InputPortNames
        Port0              "X1"
        Port1              "X2"
    }
    List {
        ListType           OutputPortNames
        Port0              "01"
        Port1              "02"
    }
    List {
        ListType           OutputPortBusObjects
        Port0              " "
        Port1              " "
    }
    .....
}
```

The exemplary information on the Main System block 430 includes the version designation of the referenced model 500 in FIG. 5A, which is designated as a version number 1.1. One of skill in the art will appreciate that the version number is an illustrative version designation and the version may be designated using symbols other than numbers. The version number 1.1 may be referred to as a first version of the referenced model 500. The first version of the referenced model 500 includes the interface of inputs X1 and X2 and outputs O1 and O2. The first version 500 also includes a function block 510 located between input X1 and output O1 and a gain block 520 located between input X2 and output O2. The gain of the gain block 520 is set to 5.

Figure 5B:
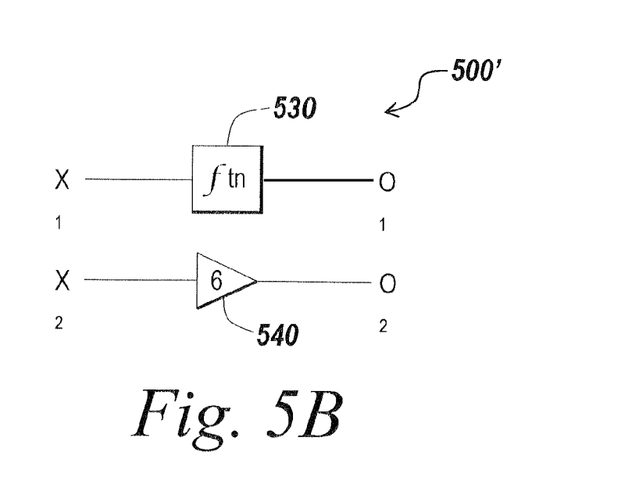
FIG. 5B-5C are illustrative revisions of the model depicted in FIG. 5A.
Figure 5C:
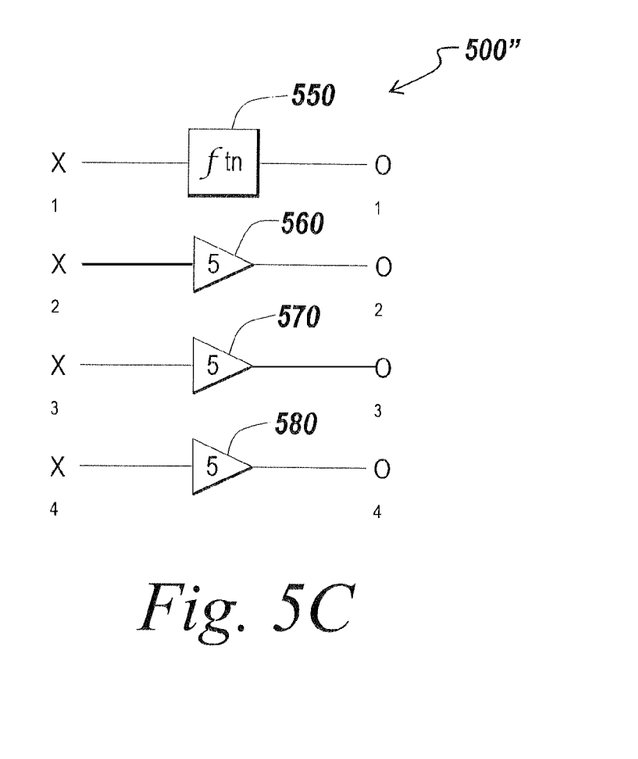

FIG. 5B-5C are illustrative revisions of the first version 500 depicted in FIG. 5A. Assuming that the first version 500 depicted in FIG. 5A is modified to a second version 500' depicted in FIG. 5B in which the function block 530 remains the same as the function block 510 in FIG. 5A and the gain in the gain block 540 is changed to 6. The interface of the second version 500' also remains the same as the first version 500. The model version number of the second version is automatically changed to, for example, 1.2 when the second version 500' is checked in the source control system 130. Although the model version number of the second version 500' is changed to 1.2, the version number of the interface of the second version 500' is separately managed so that the version number of the interface of the second version 500' remains the same as the interface version number of the first version 500 because the second version 500' is compatible with the first version 500 and still matches with the interface of the Main System block 430. The version number of the interface of a version may differ from the model version number of the version when the interface of the version is compatible with the interface of the previous version. In determining compatibility of the interface of the version 500' or 500 with the parent model 400, the ComputedInterfaceVersion is compared with the interface version string stored in the Main System block 430. Sample code which represents the interface for the first version 500 is provided as follows.

```
GraphicalInterface {
   NumRootInports                2
   Inport {
      Name    "X1"
   }
   Inport {
      Name    "X2"
   }
   NumRootOutports               2
   Outport {
      BusOutputAsStruct          "off"
      Name                       "O1"
   }
   Outport {
      BusOutputAsStruct          "off"
      Name                       "O2"
   }
   ParameterArgumentNames        " "
   ComputedModelVersion          "1.1"
   ComputedInterfaceVersion      "1.1"
   NumTestPointedSignals         0
}
```

Sample code which represents the interface for the second version 500' is provided as follows.

```
GraphicalInterface {
   NumRootInports                2
   Inport {
      Name    "X1"
   }
   Inport {
      Name    "X2"
   }
   NumRootOutports               2
   Outport {
      BusOutputAsStruct          "off"
      Name                       "O1"
   }
   Outport {
      BusOutputAsStruct          "off"
      Name                       "O2"
   }
   ParameterArgumentNames        " "
   ComputedModelVersion          "1.2"
   ComputedInterfaceVersion      "1.1"
   NumTestPointedSignals         0
}
```

The ComputedInterfaceVersion is still the same for the first versions 500 and the second version 500', but the ComputedModelVersion has been increased to 1.2.

Assuming that the second version 500' is modified again to the third version 500" depicted in FIG. 5C, the third version 500" includes four inputs X1-X4, four outputs O1-O4, a function block 550 and three gain blocks 560-680. The model version number of the third version 500" is automatically changed to, for example, 1.3 when the third version 500" is checked in the source control system 130. The third version 500" has different content and interface than the first and second version 500 and 500'. In particular, the interface of the third version 500" is not compatible with the interface of the first and second version 500 and 500'. Therefore, the version number of the interface of the third version 500" is changed to, for example, 1.2 when the third version 500" is checked in the source control system 130. This means that the third version 500" has a different version number (1.2) for the interface than the version number (1.1) for the interface of the first and second versions 500 and 500'. The following is the exemplary information stored in the third version 500" where the version number of the interface of the third version 500" is designated as 1.2 and the Model version of the third model 500" is designated as 1.3.

```
ThirdVersion{
   ....
   GraphicalInterface {
      NumRootInports             4
      Inport {
         Name                    "X1"
      }
      Inport {
         Name                    "X2"
      }
      Inport {
         Name                    "X3"
      }
      Inport {
         Name                    "X4"
      }
      NumRootOutports            4
      Outport {
         BusOutputAsStruct       "off"
         Name                    "O1"
      }
      Outport {
         BusOutputAsStruct       "off"
         Name                    "O2"
      }
      Outport {
         BusOutputAsStruct       "off"
         Name                    "O3"
```

-continued

```
    }
    Outport {
        BusOutputAsStruct        "off"
        Name                     "O4"
    }
    ParameterArgumentNames       " "
    ComputedModelVersion         "1.3"
    ComputedInterfaceVersion     "1.2"
    NumTestPointedSignals        0
}
```

Figure 6A:
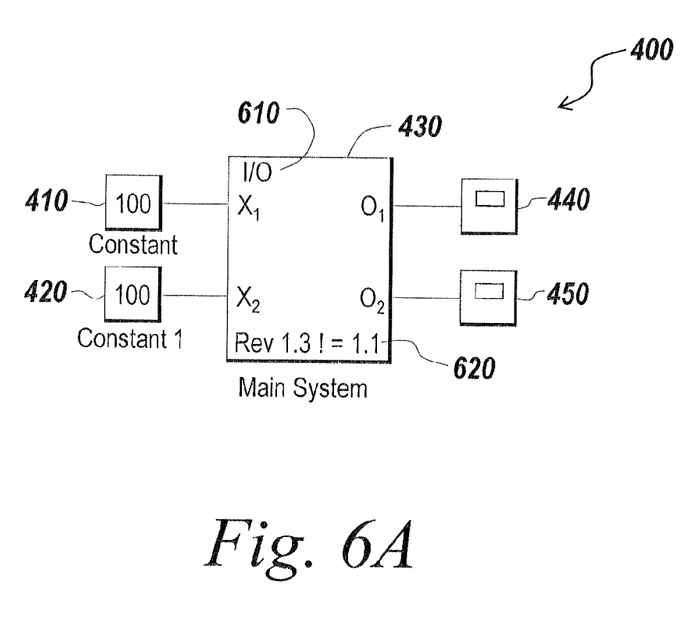
FIG. 6A is the exemplary model depicted in FIG. 4 with the version information displayed on the Main System block in the illustrative embodiment of the present invention.
Figure 6B:
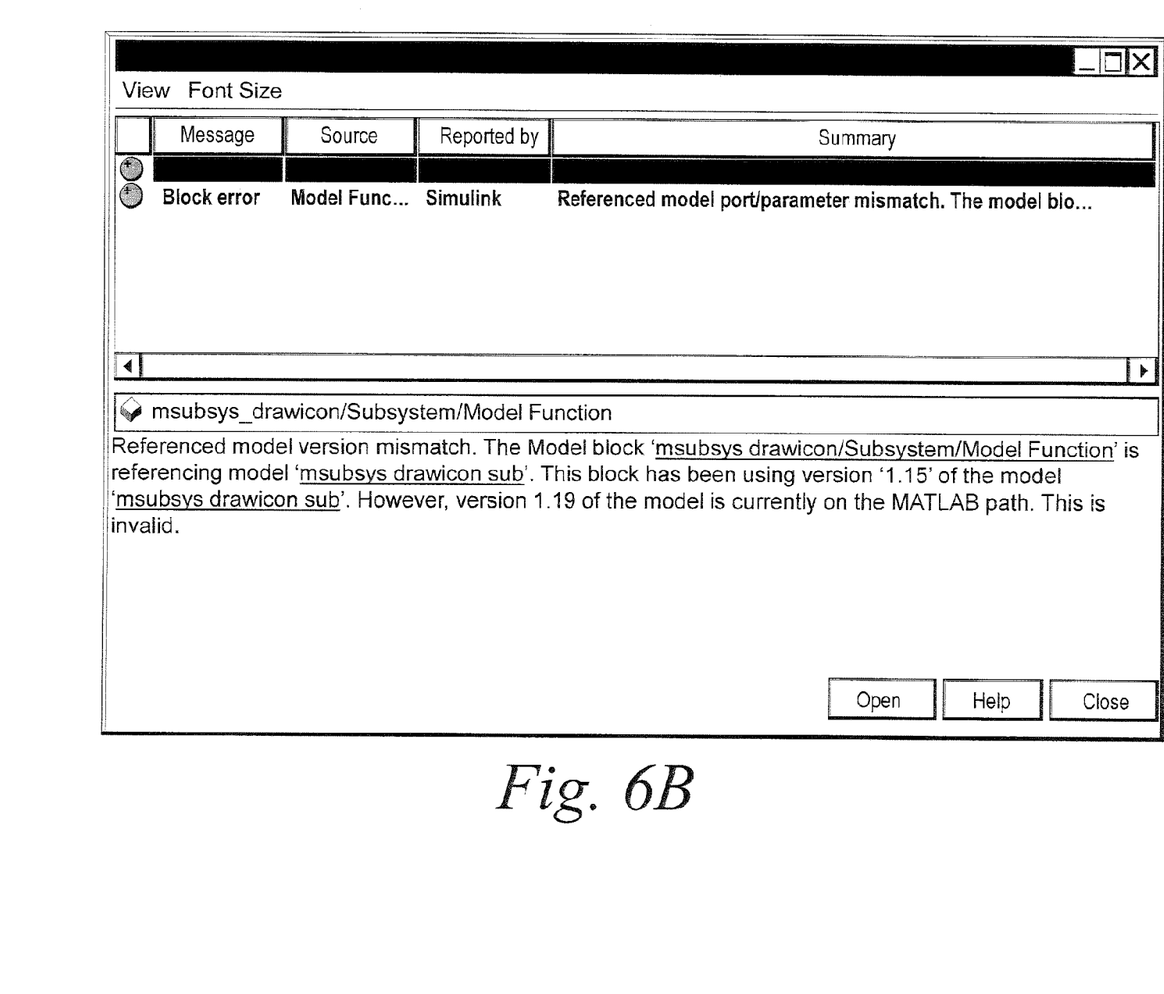
FIGS. 6B and 6C are exemplary error reports that provide information regarding I/O and version mismatches, respectively.
Figure 6C:
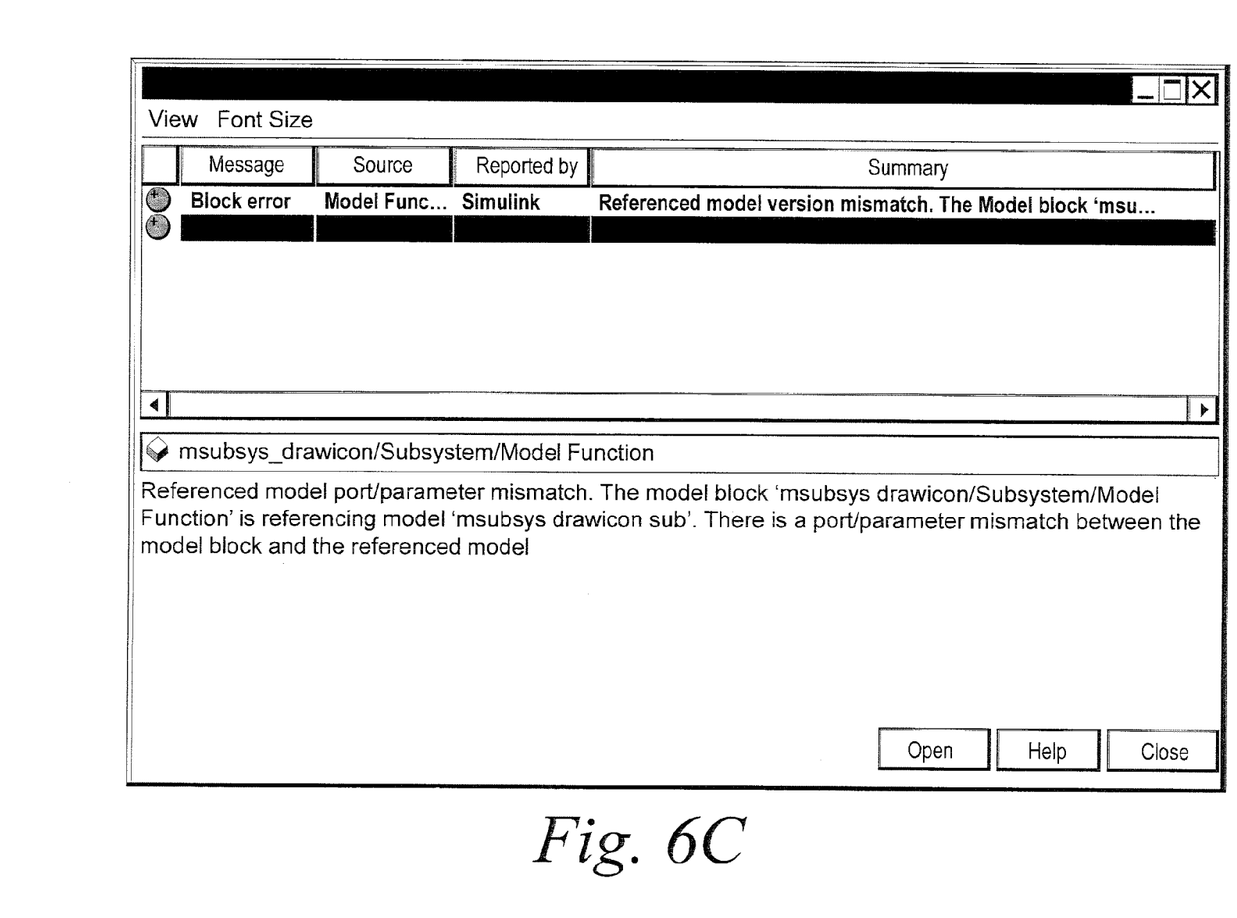
Figure 7:
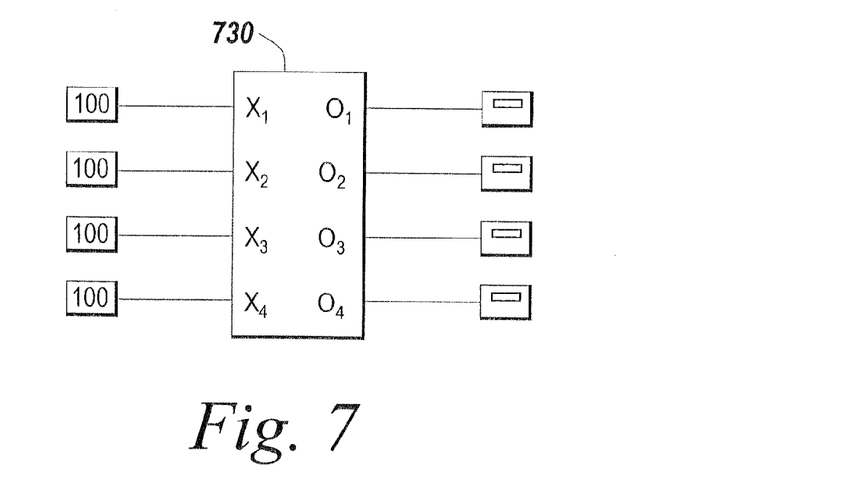
FIG. 7 is an exemplary model in which the Main System block depicted in FIG. 4 is refreshed with the interface and content of the third version shown in FIG. 5C.

FIG. 6A is the exemplary model 400 in which the Main System block 430 is displayed with the version information on its block when the model 400 is loaded in the memory 260 after the first version 500 is modified to, for example, the third version 500" in the illustrative embodiment of the present invention. The 'I/O' 610 indicates that the interface of the Main System block 430 mismatches with the interface of the third version 500". As described above, the interface of the third version 500" does not match with the interfaces of the Main System block 430. Also, the ModelVersion in the third version 500" does not match the ModelVersion in the Main System block 430. In the illustrative embodiment, the version number (1.1) in the Main System block 430 is compared with the version number (1.2) of the interface of the third version 500" to determine whether the interface of the Main System block 430 matches with the interface of the third version 500". If these two version numbers are different, the interface of the Main System block 430 does not match the interface of the third version 500". In addition, the referenced model version number of the first version 500, version 1.1 that is initially referenced by the Main System block 430 and the version number of the third version 500", version 1.3, do not match are displayed together 620 on the Main System block 430. If the I/O mismatch or the version mismatch occurs, the modeling environment 100 provides error reports to inform users of the I/O mismatch or version mismatch. FIGS. 6B and 6C are exemplary error reports that provide information regarding I/O mismatch and version mismatch, respectively. If the indication of an I/O mismatch or version mismatch occurs, users may correct the mismatch in the illustrative embodiment of the present invention, which will be described in more detail with reference to FIGS. 8 and 9. If the I/O mismatch or version mismatch is indicated on the display of the Main System block 430, users may refresh the Main System block 430 with the interface and content of the third version 500". FIG. 7 is the model 400 that includes a Main System block 730 refreshed with the third version 500" depicted in FIG. 5C.

In addition, when loading the model 400, a list of interface versions is displayed which can be used to select and load a particular interface. In this case there are two interface versions. If the interface version 1.2 is selected, there will be an interface version mismatch and model Version mismatch as indicated above. If the interface 1.1 is selected, there is no interface version mismatch but there is a model version mismatch.

Figure 8:
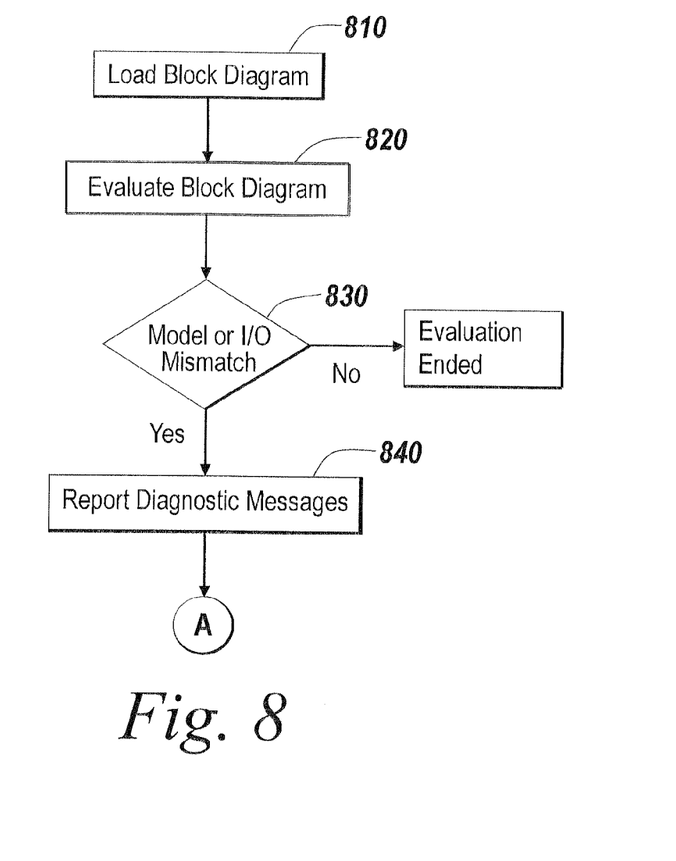
FIGS. 8 and 9 are flow charts showing the operation of the version control in the illustrative embodiment of the present invention.
Figure 9:
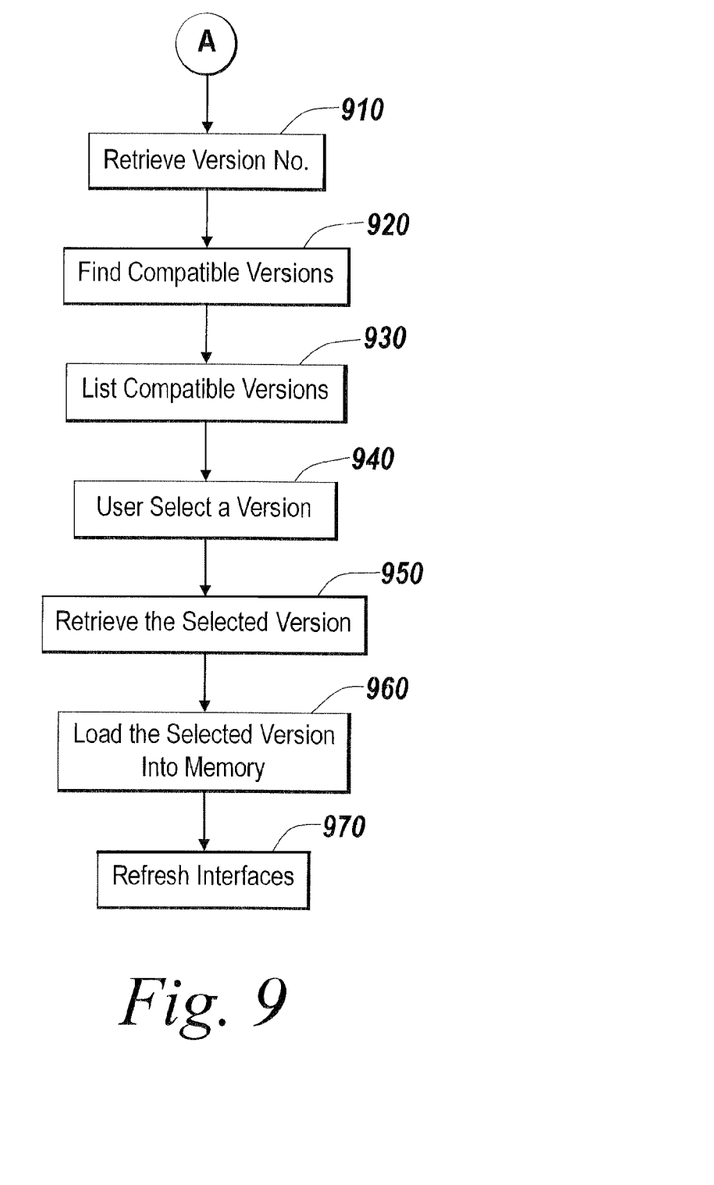

FIGS. 8 and 9 are flow charts showing the operation of the version control in the illustrative embodiment of the present invention. First, a block diagram of a model (parent model) is loaded in a memory (step 810). The model is checked out of the source control system 130 and loaded from the repository 140 directly to the memory. The parent model may include a component block that refers to another model (referenced model). The modeling tool 120 evaluates the block diagram of the parent model to determine whether there is an I/O (interface) version mismatch or model version mismatch in the component of the parent model that refers to a referenced model (step 820). In evaluating the block diagram of the parent model, the modeling tool 120 utilizes the version information of the referenced model stored in the parent model. The version information stored in the parent model includes a model version number and an I/O (interface) version number of the referenced model that the component block refers to. The model version number and I/O (interface) version number stored in the parent model are compared with the model version number and I/O version number of the referenced model stored in the referenced model, respectively. If the version numbers are different in each comparison (step 830), an I/O version mismatch or model version mismatch is displayed on the representation of the component block. An error report may be provided if the I/O version mismatch or model version mismatch occurs (step 840). The modeling tool 120 may further provide an inquiry whether users want to fix the mismatch. If the users want to fix the error, the modeling tool 120 retrieves the model or I/O version numbers of the model that the component block refers to (step 910) and finds compatible versions (step 920). The modeling tool 120 may provide users with a list of the compatible versions (step 930) so that the users may select one of the versions (step 940). In determining the compatibility of versions, the modeling tool 120 may match configuration of the versions including the interface and content of the versions. If the users select one of a model version and interface version, the selected version is retrieved from the source control system 130 (step 950) and loaded in the primary memory (step 960). Finally, the component block of the model is refreshed with the interface and content of the retrieved version (step 970).

In summary, the illustrative embodiment of the present invention provides version control of a model in modeling environments. The illustrative embodiment of the present invention checks a model in/out of a source control system that contains versions of the model. The version number of the model is by default automatically increased when the model is checked in the source control system. A selected version of the model is checked out of the source control system and directly loaded in a primary memory. The illustrative embodiment of the present invention also provides version control of a component of a first model that refers to a second model. The first model includes version information of the second model so that the version information of the second model is evaluated to determine whether the interface of the component of the first model matches with the interface of the second model. The interface version mismatch or model version mismatch between the component of the first model and the second model is displayed on the representation of the component of the first model. Users may select a version of the second model and refresh the component of the first model with the selected version of the second model.

It will thus be seen that the invention attains the objectives stated in the previous description. Since certain changes may be made without departing from the scope of the present invention, it is intended that all matter contained in the above description or shown in the accompanying drawings be interpreted as illustrative and not in a literal sense. For example, the illustrative embodiment of the present invention may be practiced in any graphical programming, block diagram and modeling environment that provides versions of a model. Practitioners of the art will realize that the sequence of steps and architectures depicted in the figures may be altered without departing from the scope of the present invention and that the illustrations contained herein are singular examples of a multitude of possible depictions of the present invention.

We claim:

1. A method comprising:
   identifying, with a processor, that a mismatch exists between a first version of a first executable graphical model and a first version of a second executable graphical model, the first version of the second executable graphical model referenced by an executable component of the first executable graphical model, where:
   the executable component references the first version of the second executable graphical model for communicating with the first version of the second executable graphical model;
   identifying, with the processor, a second version of the second executable graphical model, the second version of the second executable graphical model capable of being referenced by the executable component; and
   updating, with the processor, the executable component of the first executable graphical model, the updating comprising:
   referencing the second version of the second executable graphical model, the referencing allowing the executable component to communicate with the second version of the second executable graphical model.

2. The method of claim 1, further comprising:
   displaying the first version of the first executable graphical model;
   displaying the second version of the second executable graphical model; and
   displaying a visual cue in connection with the executable component of the first executable graphical model, the visual cue including information associated with the second executable graphical model.

3. The method of claim 2, wherein the visual cue indicates version information associated with the second executable graphical model.

4. The method of claim 3, wherein the version information includes one or more of a version number, a change log, author information or a data of changes associated with the second executable graphical model.

5. The method of claim 1, further comprising:
   finding a plurality of versions of the second executable graphical model, where:
   one or more of the plurality of versions for the second executable graphical model are compatible with the first version of the first executable graphical model; and
   receiving an input to select the second version of the second executable graphical model from the one or more of the plurality of versions of the second executable graphical model.

6. The method of claim 5, further comprising:
   displaying the plurality of versions of the second executable graphical model.

7. The method of claim 1, further comprising:
   storing the first executable graphical model or the second executable graphical model in a storage;
   increasing a value of the version of the first executable graphical model when the first executable graphical model is checked into the storage; and
   increasing a value of the version of the second executable graphical model when the second executable graphical model is checked into the storage.

8. A non-transitory computer-readable storage medium storing one or more instructions that when executed on a processor, cause the processor to:
   identify, with a processor, that a mismatch exists between a first version of a first executable graphical model and a first version of a second executable graphical model, the first version of the second executable graphical model referenced by an executable component of the first executable graphical model, where:
   the executable component references the first version of the second executable graphical model for communicating with the first version of the second executable graphical model;
   identify, with the processor, a second version of the second executable graphical model, the second version of the second executable graphical model capable of being referenced by the executable component; and
   update, with the processor, the executable component of the first executable graphical model, the updating comprising:
   referencing the second version of the second executable graphical model, the referencing allowing the executable component to communicate with the second version of the second executable graphical model.

9. The medium of claim 8, further storing one or more instructions that when executed on a processor, cause the processor to:
   display the first version of the first executable graphical model;
   display the second version of the second executable graphical model; and
   display a visual cue in connection with the executable component of the first executable graphical model, the visual cue including information associated with the second executable graphical model.

10. The medium of claim 9, wherein the visual cue indicates version information associated with the second executable graphical model.

11. The medium of claim 10, wherein the version information includes one or more of a version number, a change log, author information or a data of changes associated with the second executable graphical model.

12. The medium of claim 8, further storing one or more instructions that when executed on a processor, cause the processor to:
   find a plurality of versions of the second executable graphical model, where:
   one or more of the plurality of versions for the second executable graphical model are compatible with the first version of the first executable graphical model; and
   receive an input to select the second version of the second executable graphical model from the one or more of the plurality of versions of the second executable graphical model.

13. The medium of claim 12, further storing one or more instructions that when executed on a processor, cause the processor to:
   display the plurality of versions of the second executable graphical model.

14. The medium of claim 8, further storing one or more instructions that when executed on a processor, cause the processor to:
   store the first executable graphical model or the second executable graphical model in a storage;
   increase a value of the version of the first executable graphical model when the first executable graphical model is checked into the storage; and
   increase a value of the version of the second executable graphical model when the second executable graphical model is checked into the storage.

15. A system comprising:
a processor executing one or more instructions for:
- identifying that a mismatch exists between a first version of a first executable graphical model and a first version of a second executable graphical model, the first version of the second executable graphical model referenced by an executable component of the first executable graphical model, where:
  - the executable component references the first version of the second executable graphical model for communicating with the first version of the second executable graphical model;
- identifying a second version of the second executable graphical model, the second version of the second executable graphical model capable of being referenced by the executable component; and
- updating the executable component of the first executable graphical model, the updating comprising:
  - referencing the second version of the second executable graphical model, the referencing allowing the executable component to communicate with the second version of the second executable graphical model.

16. The system of claim 15, further comprising:
a display device for:
- displaying the first version of the first executable graphical model;
- displaying the second version of the second executable graphical model; and
- displaying a visual cue in connection with the executable component of the first executable graphical model, the visual cue including information associated with the second executable graphical model.

17. The system of claim 16, wherein the visual cue indicates version information associated with the second executable graphical model.

18. The system of claim 17, wherein the version information includes one or more of a version number, a change log, author information or a data of changes associated with the second executable graphical model.

19. The system of claim 15, further comprising:
- a storage for storing the first executable graphical model or the second executable graphical model in a storage;
- wherein the processor further executes one or more instructions for:
  - increase a value of the version of the first executable graphical model when the first executable graphical model is checked into the storage; and
  - increase a value of the version of the second executable graphical model when the second executable graphical model is checked into the storage.

20. The system of claim 15, wherein the processor executes one or more instructions for:
- finding a plurality of versions of the second executable graphical model, where:
  - one or more of the plurality of versions for the second executable graphical model are compatible with the first version of the first executable graphical model; and
- receiving an input to select the second version of the second executable graphical model from the one or more of the plurality of versions of the second executable graphical model.

\* \* \* \* \*